United States Patent [19]

Cunningham

[11] 4,143,709

[45] Mar. 13, 1979

[54] TUBE SUPPORT SYSTEM

[75] Inventor: Richard C. Cunningham, Pleasant Hills, Pa.

[73] Assignee: Westinghouse Electric Corp., Pittsburgh, Pa.

[21] Appl. No.: 777,863

[22] Filed: Mar. 15, 1977

[51] Int. Cl.² .............................................. F28F 9/00
[52] U.S. Cl. .................................. 165/172; 248/68 R
[58] Field of Search ................... 165/162, 172, 178; 122/510; 248/68 R

[56] References Cited

U.S. PATENT DOCUMENTS

| | | | |
|---|---|---|---|
| 1,724,885 | 8/1929 | Paige | 165/172 |
| 3,366,172 | 1/1968 | Doroszlai | 165/172 |
| 3,399,719 | 9/1968 | Forrest et al. | 165/162 |
| 3,420,297 | 1/1969 | Romanos | 165/162 |
| 3,820,594 | 1/1974 | Ritland et al. | 165/172 |
| 3,967,677 | 7/1976 | Mohlman | 122/510 |
| 3,998,268 | 12/1976 | Sagan | 165/172 |

FOREIGN PATENT DOCUMENTS 847179  6/1952  Fed. Rep. of Germany ........... 165/172

Primary Examiner—Sheldon J. Richter
Attorney, Agent, or Firm—F. J. Baehr, Jr.

[57] ABSTRACT

Tube support sheets fabricated from bars or machined from plates to have holes which receive a plurality of tubes. Adjacent support sheets cooperate to restrict lateral movement of the tubes without completely surrounding each tube at a tube support sheet and provide large open areas for fluid flow adjacent thereto.

5 Claims, 2 Drawing Figures

4,143,709

TUBE SUPPORT SYSTEM

BACKGROUND OF THE INVENTION

This invention relates to tube support sheets and more particularly to support sheets for closely packed tubes. Nuclear steam generators have had problems with the buildup of deposits between the tubes and the tube support sheets wherein the holes in the tube support sheets through which the tubes pass are only slightly larger in diameter than the tubes allowing the buildup of deposits therebetween resulting in a sphincter crushing of the tubes at the tube sheet. The close proximity of the tube sheet to the tube impairs the flow of fluid along the tube and results in poor heat transfer between the tube and the fluid flowing along the outer side of the tube adjacent the tube sheet.

SUMMARY OF THE INVENTION

In general, a tube support system for closely packed tubes disposed in a heat exchanger, when made in accordance with this invention, comprises at least two spaced apart support assemblies transversely disposed with respect to the tubes, each support assembly comprises a first set of generally parallel members making contact with the tubes and a second set of generally parallel members making contact with the tubes. Each set is provided with openings through which two or more tubes pass and the space between the plurality of tubes is left open for free flow of fluid adjacent to the tubes. The first and second set of members cooperate to define openings through which the tubes pass. The spaced apart support assemblies so constituted are disposed out of phase with at least one adjacent assembly to support the tubes against lateral movement, minimizing the contact between the tubes and the support system to nominally two lines, disposed 90° to 120° around each tube. The flow area around the tubes adjacent the support assembly is maximized by eliminating support sheet structure between the tubes.

BRIEF DESCRIPTION OF THE DRAWINGS

The objects and advantages of this invention will become more apparent from reading the following detail description in connection with the accompanying drawings in which.

DESCRIPTION OF THE PREFERRED EMBODIMENTS

Figure 1:
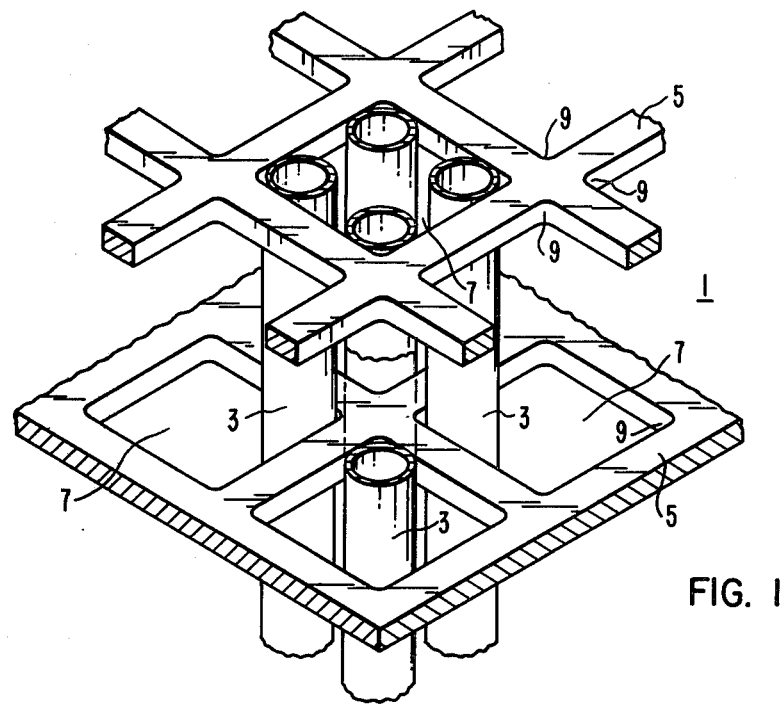
FIG. 1 is a partial isometric view of a tube support system for closely packed tubes made in accordance with this invention.
Figure 2:
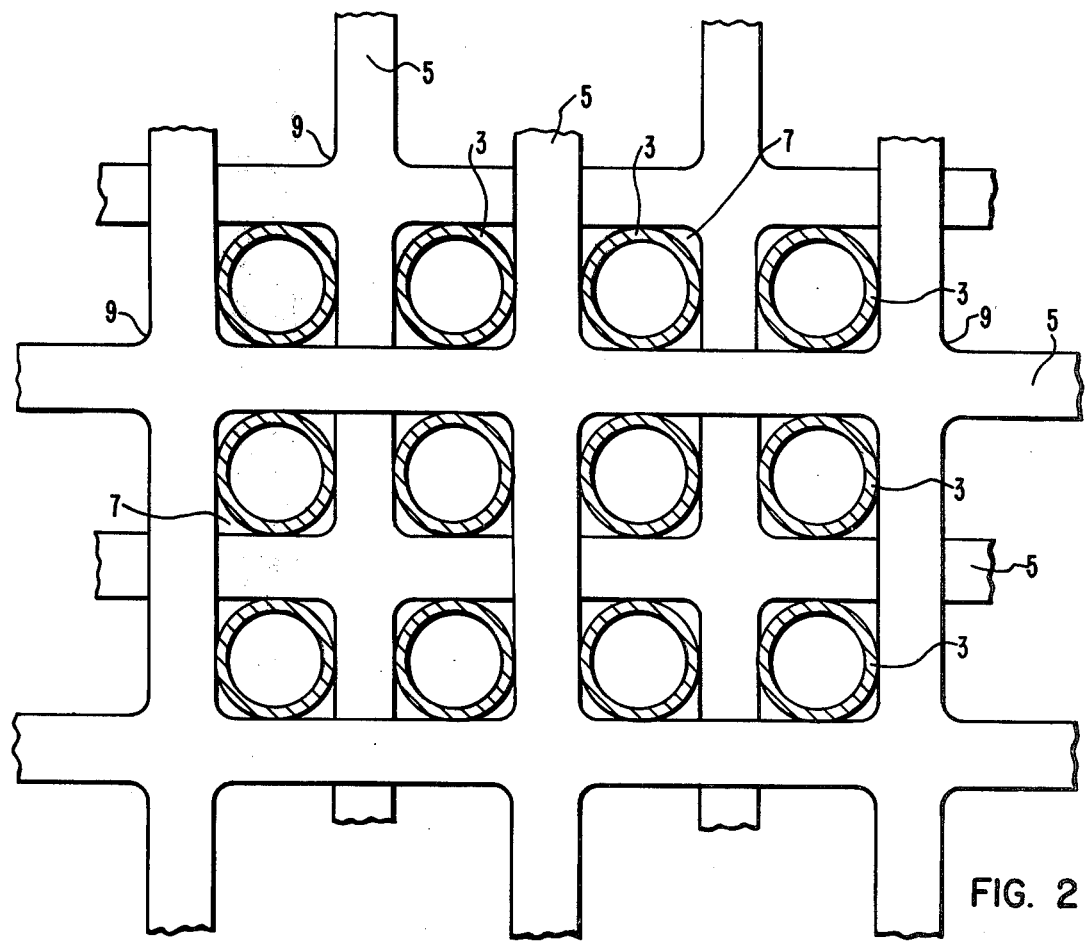
FIG. 2 is a partial sectional view of the tube support system shown in FIG. 1.

Referring now to the drawings in detail and in particular to FIGS. 1 and 2 there is shown a tube support system 1 for supporting closely packed tubes 3, the tube support system 1 is typically transversely disposed with respect to the tubes in a heat exchanger, such as a steam generator.

The tube support system 1 comprises adjacent support plates, sheets or assemblies 5 having a plurality of holes 7, each of which receives a plurality of tubes 3. The holes 7 in adjacent plates 5 are out of phase or staggered. The adjacent plates 5 are so disposed that each plate makes contact with each tube at one or two locations so that the adjacent plates engage the tubes on opposite sides thereof to support them against lateral movement. The openings 7 have corners 9 which may be rounded and depending on the method of fabricating the radius of the corner is normally unequal to the radius of the tube. Contact between the plate and the tube can thus be varied. A single line contact will be formed if the radius of the corner 9 is greater than the radius of the tube 3, if the corners 9 have the same radius there will be arcuate contact between the plate 5 and the tube 3 and if the radius of the corner 9 is less than the radius of the tube the plate 5 will form two line contacts with the tube 3. Therefore the shape of the corners 9 will not only determine the type of contact between the plate 5 and the tube 3, but also the location of the contact on the tube 3.

While the embodiments shown in FIGS. 1 and 2 show integral support plates or assemblies formed from a single sheet, it is to be understood that each assembly 5 could be formed from a first set of generally parallel bars or members, which cooperate with a second set of generally parallel bars or members, the sets of bars or members overlapping and cooperating to define the openings 7 which receive a plurality of tubes. To produce the square or rectangular openings 7 shown in FIGS. 1 and 2 the sets of bars would cross at right angles to one another forming openings with sharp corners. Therefore, there would be two line contacts between the bars and the tubes at locations displaced approximately 90° on the tubes. Each assembly would be so arranged that at least one adjacent assembly is out of phase or staggered so that each tube would be contacted in four places so as to limit each lateral movement and yet provide free fluid flow on the outside of the tube.

Due to the fact that the number of tubes is not necessarily a multiple of the number of holes in a support assembly and also because the layout pattern of the tubes may be so arranged that the tubes fit within a cylindrical vessel, adjacent support systems 5 are not necessarily symmetrical, and some openings adapted to receive a single tube may be required.

Figure 3:
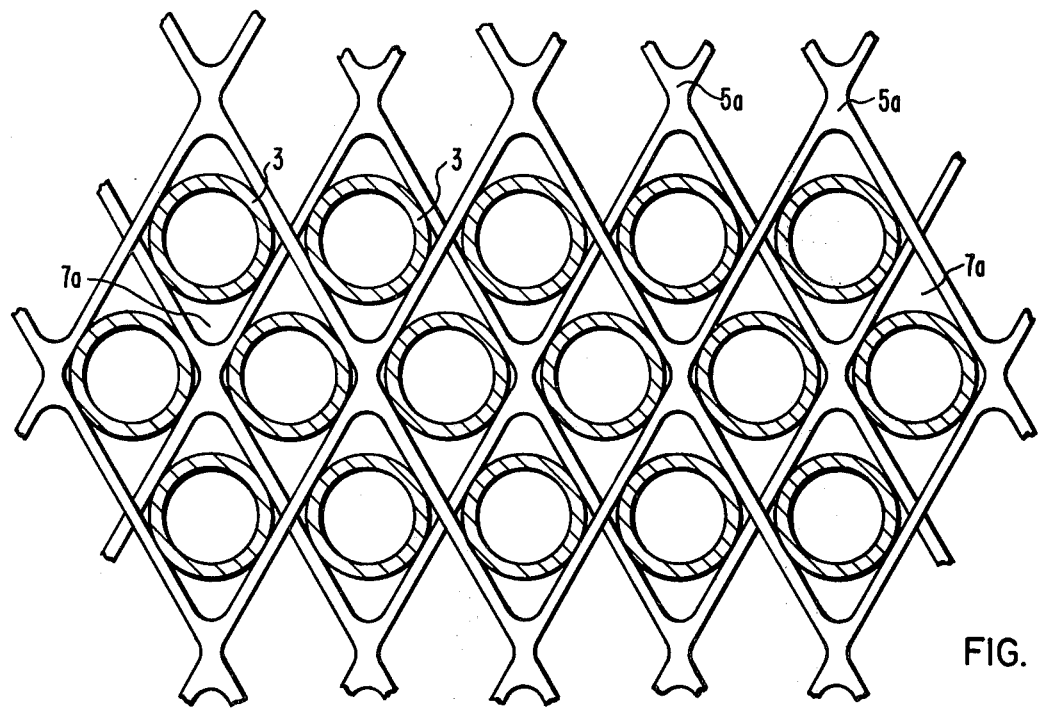
FIG. 3 is a partial sectional view of an alternate tube support system.
Figure 4:
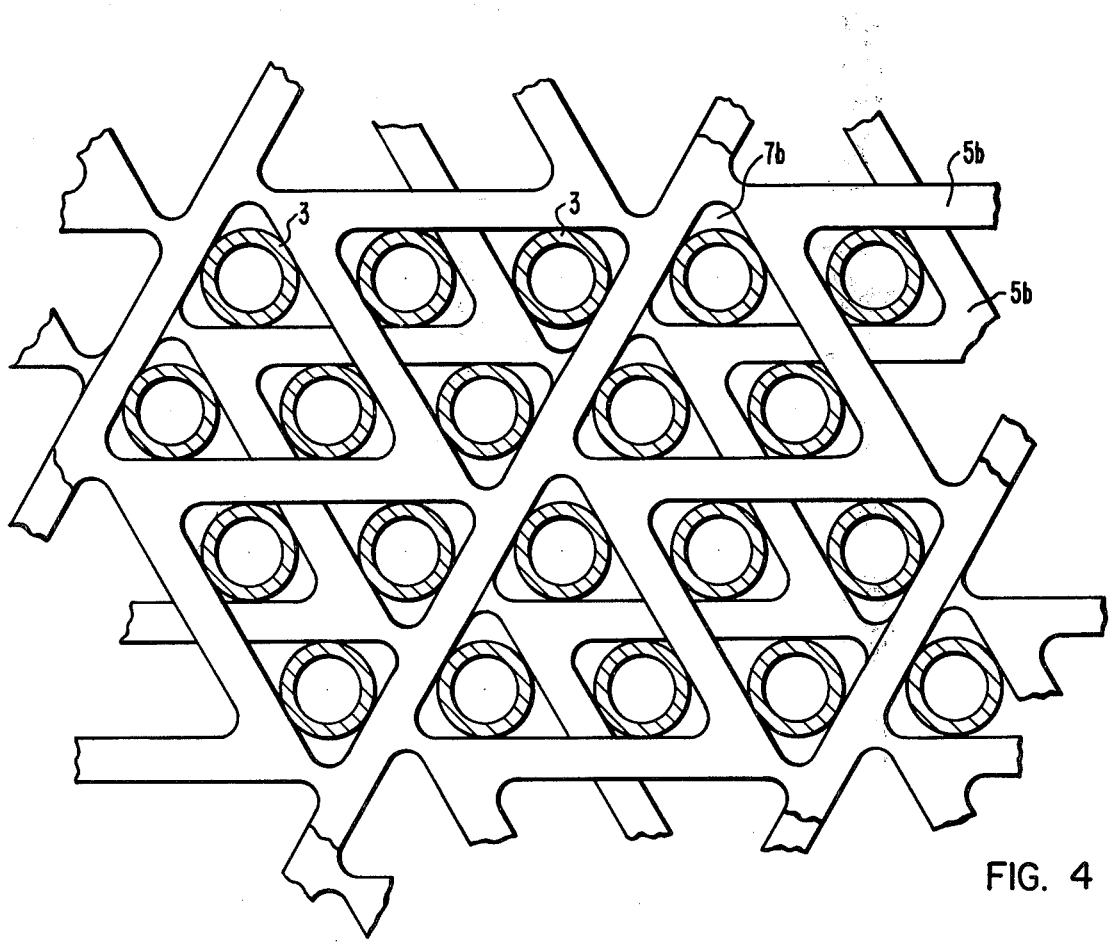
FIG. 4 is a partial sectional view of another alternate tube support system.

As shown in FIG. 1, the openings are rectangular or square-shaped to accommodate tubes disposed on a square pitch, this is the preferred embodiment when such a pitch is utilized. However, it is common practice to utilize a triangular pitch in order to increase the number of tubes in a given area and maintain a constant ligament space between the tubes as they pass through a tube sheet. When such a tube arrangement is utilized, the openings 7a and 7b as shown in FIGS. 3 and 4 respectively would be utilized. In FIGS. 3 and 4 the openings 7a and 7b each receive a plurality of tubes 3. However, the shape of the openings may vary. As shown in FIG. 3, it may be diamond-shaped, or as shown in FIG. 4 it may be triangular-shaped. In either case, at least one adjacent support assembly or plate 5a or 5b, respectively, would be disposed out of phase or staggered so that the cooperation between adjacent assemblies would support the tubes 3 from opposite sides to restrain lateral movement of the tubes 3.

The assemblies shown in FIGS. 3 and 4 could also be formed from sets of parallel bars or members arranged to define the triangular or diamond-shaped openings, however, in order to form the triangular-shaped openings, three sets of generally parallel bars or members are required. In such a case the three sets of parallel bars would cooperate to define the triangular-shaped opening 7b.

The support assemblies hereinbefore described advantageously eliminate the possibility of sphincter distortion of the tubes by eliminating the support sheet proximity over more that 180° of the periphery and at the same time eliminates low clearance traps over most of the tube periphery thus eliminating the boiling concentration which forms deposits on the full periphery of the tube adjacent the tube support. By providing a flushing or cleaning flow over the majority of the outer surface of the tube, the local heat transfer is improved and the boiling concentration is reduced. The possibility of sphincter of the tube at the support plates is eliminated; lower flow resistance for axial flow on the exterior of the tubes is provided; higher recirculation rates in recirculating vertical steam generators is permitted; support plate loading under line break accident situations is reduced; and the heat transfer is improved by exposing the full length of the tube to axial fluid flow.

What is claimed is:
1. A tube support system for closely packed tubes disposed in a heat exchanger, said tube support system comprising at least two spaced apart support plates transversely disposed with respect to said tubes, each support plate being integrally formed from a single sheet and having a plurality of holes which accept a plurality of tubes, adjacent plates having the holes offset so that adjacent plates cooperate to support the tubes against lateral movement, minimize the contact surface between the tubes and the support plates, and maximize the flow of fluid across the support plates.
2. A tube support system as set forth in claim 1, wherein the holes are rectangular shaped.
3. A tube support system as set forth in claim 1, wherein the holes are generally square-shaped.
4. A tube support system as set forth in claim 1, wherein the holes are generally triangular-shaped.
5. A tube support system as set forth in claim 1, wherein the holes are generally diamond-shaped.